(12) United States Patent
Juza et al.

(10) Patent No.: US 8,538,171 B2
(45) Date of Patent: Sep. 17, 2013

(54) METHOD AND SYSTEM FOR OBJECT DETECTION IN IMAGES UTILIZING ADAPTIVE SCANNING

(75) Inventors: Michal Juza, Prague (CZ); Tomas Gold, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 1539 days.

(21) Appl. No.: 12/058,224

(22) Filed: Mar. 28, 2008

(65) Prior Publication Data
US 2009/0245570 A1 Oct. 1, 2009

(51) Int. Cl.
*G06K 9/62* (2006.01)
*G06K 9/00* (2006.01)

(52) U.S. Cl.
USPC ........... 382/224; 382/225; 382/103; 382/227; 382/159

(58) Field of Classification Search
USPC .................. 382/103, 155–159, 181, 224–229
See application file for complete search history.

(56) References Cited

U.S. PATENT DOCUMENTS

| | | | |
|---|---|---|---|
| 5,852,669 A * | 12/1998 | Eleftheriadis et al. | 382/118 |
| 6,005,610 A * | 12/1999 | Pingali | 348/169 |
| 6,408,109 B1 * | 6/2002 | Silver et al. | 382/300 |
| 7,106,886 B2 * | 9/2006 | Shimakage | 382/104 |
| 7,130,446 B2 * | 10/2006 | Rui et al. | 382/103 |
| 7,151,843 B2 * | 12/2006 | Rui et al. | 382/103 |
| 7,171,025 B2 * | 1/2007 | Rui et al. | 382/103 |
| 7,184,606 B2 * | 2/2007 | Shindo et al. | 382/255 |
| 7,418,113 B2 * | 8/2008 | Porikli et al. | 382/103 |
| 7,430,303 B2 * | 9/2008 | Sefcik et al. | 382/103 |
| 7,616,814 B2 * | 11/2009 | Wolf et al. | 382/176 |
| 7,835,541 B2 * | 11/2010 | Lee et al. | 382/103 |
| 7,840,037 B2 * | 11/2010 | Lu et al. | 382/118 |
| 7,882,139 B2 * | 2/2011 | Zou et al. | 707/798 |
| 7,961,938 B1 * | 6/2011 | Remedios | 382/162 |
| 8,156,152 B2 * | 4/2012 | Zou et al. | 707/798 |
| 8,379,915 B2 * | 2/2013 | Sharon et al. | 382/103 |
| 2002/0102024 A1 * | 8/2002 | Jones et al. | 382/225 |
| 2003/0103649 A1 * | 6/2003 | Shimakage | 382/104 |
| 2003/0185420 A1 * | 10/2003 | Sefcik et al. | 382/103 |
| 2004/0165754 A1 * | 8/2004 | Tabata | 382/118 |
| 2005/0094849 A1 * | 5/2005 | Sung et al. | 382/103 |
| 2005/0210103 A1 * | 9/2005 | Rui et al. | 709/204 |
| 2005/0286774 A1 * | 12/2005 | Porikli | 382/225 |
| 2005/0288911 A1 * | 12/2005 | Porikli | 703/2 |
| 2006/0039587 A1 * | 2/2006 | Yoon et al. | 382/115 |
| 2006/0093188 A1 * | 5/2006 | Blake et al. | 382/103 |
| 2006/0120572 A1 * | 6/2006 | Li et al. | 382/118 |
| 2006/0126938 A1 * | 6/2006 | Lee et al. | 382/190 |

(Continued)

*Primary Examiner* — Matthew Bella
*Assistant Examiner* — Mia M Thomas
(74) *Attorney, Agent, or Firm* — Kermit D. Lopez; Luis M. Ortiz; Tursday A. Kaasch (57) ABSTRACT

An object detection method and system for detecting an object in an image utilizing an adaptive image scanning strategy is disclosed herein. An initial rough shift can be determined based on the size of a scanning window and the image can be scanned continuously for several detections of similar sizes using the rough shift. The scanning window can be classified with respect to a cascade of homogenous classification functions covering one or more features of the object. The size and scanning direction of the scanning window can be adaptively changed depending on the probability of the object occurrence in accordance with scan acceleration. The object can be detected by an object detector and can be localized with higher precision and accuracy.

17 Claims, 10 Drawing Sheets

(56) References Cited

U.S. PATENT DOCUMENTS

| | | | |
|---|---|---|---|
| 2006/0170769 A1* | 8/2006 | Zhou | 348/143 |
| 2006/0177131 A1* | 8/2006 | Porikli | 382/168 |
| 2006/0222205 A1* | 10/2006 | Porikli et al. | 382/103 |
| 2006/0285723 A1* | 12/2006 | Morellas et al. | 382/103 |
| 2007/0017128 A1 | 1/2007 | Chen et al. | 348/143 |
| 2007/0171281 A1* | 7/2007 | Juza et al. | 348/143 |
| 2008/0019661 A1* | 1/2008 | Obrador et al. | 386/52 |
| 2008/0019669 A1* | 1/2008 | Girshick et al. | 386/117 |
| 2008/0219558 A1* | 9/2008 | Lu et al. | 382/190 |
| 2009/0161912 A1* | 6/2009 | Yatom et al. | 382/103 |
| 2009/0245570 A1* | 10/2009 | Juza et al. | 382/103 |
| 2009/0257621 A1* | 10/2009 | Silver | 382/103 |

* cited by examiner

METHOD AND SYSTEM FOR OBJECT DETECTION IN IMAGES UTILIZING ADAPTIVE SCANNING

TECHNICAL FIELD

Embodiments are generally related to image processing systems and methods. Embodiments also relate in general to the field of computers and similar technologies, and in particular to software utilized in this field. In addition, embodiments relate to improved methods and systems for object detection and localization in images.

BACKGROUND OF THE INVENTION

Computers can be utilized to perform processing of graphic images in a digital format, such as, for example, photographs, still images from videos, and so on. Often, the goal of such processing is to locate objects of interest (e.g., faces or other areas/features) in a particular image. A computer is capable of detecting most or all well-defined instances of the object in the image, if a sufficient amount of processing time to process the image can be afforded. One common goal for object detection is the detection of human faces. Detecting objects is also useful for user interfaces, scanning of image databases, teleconferencing, electronic processing of photographs, and other suitable applications. The appearance of the objects varies greatly across individuals, images, camera locations, and illuminations.

The detection and precise localization of objects in images is a time demanding task, particularly when prior information is unavailable regarding their possible size and location. In such cases, it can be assumed that the sought objects may possess an arbitrary size and may be placed at arbitrary locations within the image. A number of prior art methods for the detection and localization of objects, such as faces in images, have been implemented. Such methods typically involve searching images for objects utilizing a scanning approach. The windows of various sizes are systematically placed at all possible locations within the image and evaluated by an object detector that determines whether an object is presented in a current scanning window.

A problem associated with such scanning approaches is that the number of possible windows in which the object is sought is extremely high even for relatively small small images, which results in a lengthy processing time. The majority of prior art techniques involve employing scanning windows of certain scales and shifting such windows utilizing a larger step whose size may be derived from the actual size of the scanning window. This strategy decreases the number of inspected windows, which generally speeds up the detection and localization process, but negatively affects detection performance and localization accuracy. Further, many detections may be lost due to skipped regions and the objects cannot be framed properly.

Therefore, a need exists for an improved method and system for object detection and localization in images. Additionally, a need exists for providing a methodology, for adaptive scanning of images to speed up the detection and localization process as disclosed in further detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for object detection and localization in images.

It is a further aspect of the present invention to provide for a method, system and computer-usable medium for the adaptive scanning of images.

The aforementioned aspects and other objectives and advantages can now be achieved as described herein. An object detection method and system for detecting an object in an image utilizing an adaptive image scanning strategy is disclosed herein. An initial rough shift can be determined based on the size of a scanning window and the image can be scanned continuously for several detections of similar sizes using the rough shift. The scanning window can be classified with respect to a cascade of homogenous classification functions covering one or more features of the object. The size and scanning direction of the scanning window can be adaptively changed depending on the probability of the object occurrence in accordance with scan acceleration. The object can be detected by an object detector and can be localized with higher precision and accuracy.

The cascade of homogeneous classification functions can be applied to each of the scanning windows in order to determine whether there is a sought object within the scanning window. The encountered detections can be collected and utilized for further processing in order to output a single detection. The scanning window can be shifted in all directions using a small step and the window size can be varied. The window confidences for the new window can be evaluated utilizing the object detector and the and the gradients of the confidence function i.e., the output of the object detector can be estimated. The detector response on the new window that is higher than the response on the current scanning window can be determined. If the detector response is higher the process can be continued for the new window. Otherwise, the current window can be returned as most accurate object location/size. Such method and system for detecting objects in the image results in a better scan acceleration and fine object localization.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
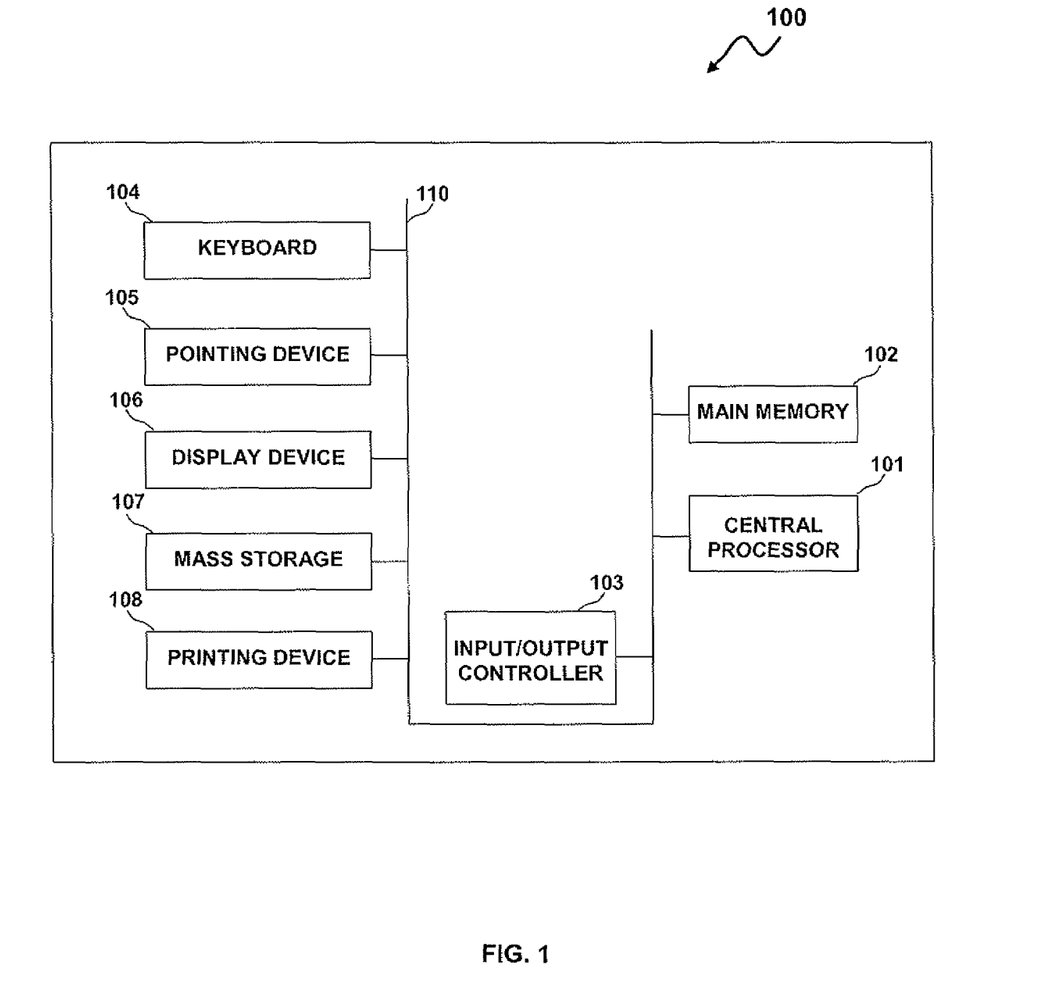
FIG. 1 illustrates a schematic view of a computer system in which the present invention may be embodied.
Figure 2:
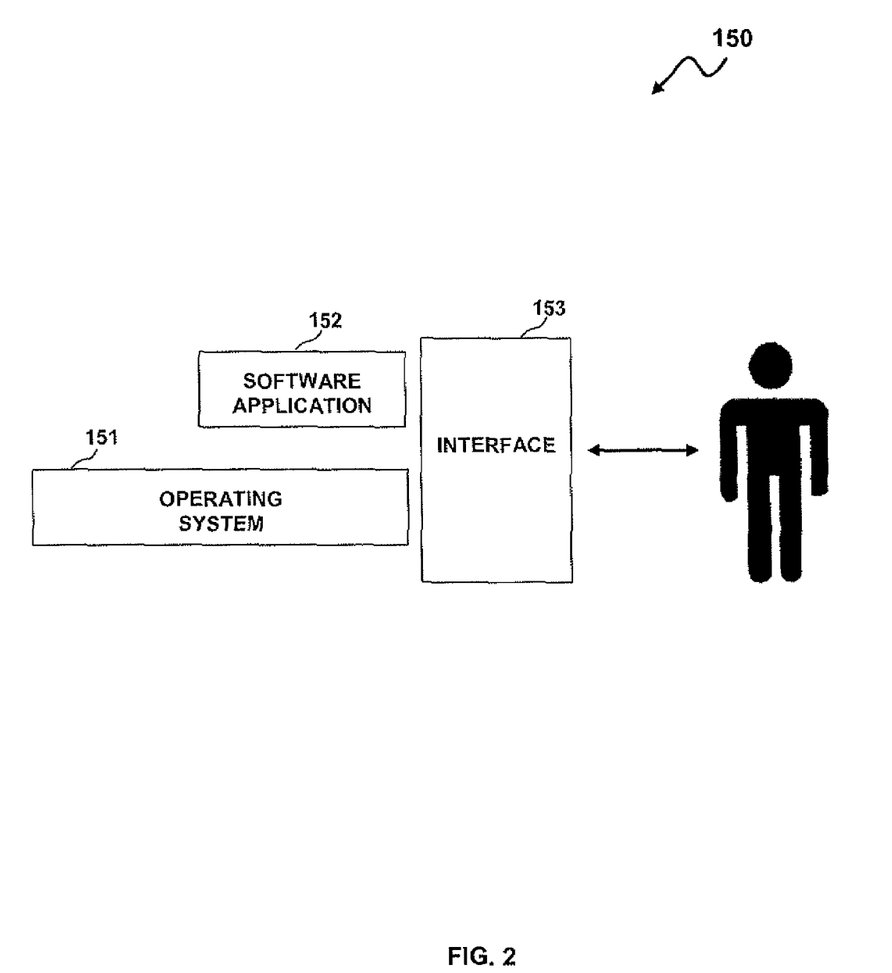
FIG. 2 illustrates a schematic view of a software system including an operating system, application software, and a user interface for carrying out the present invention.
Figure 3:
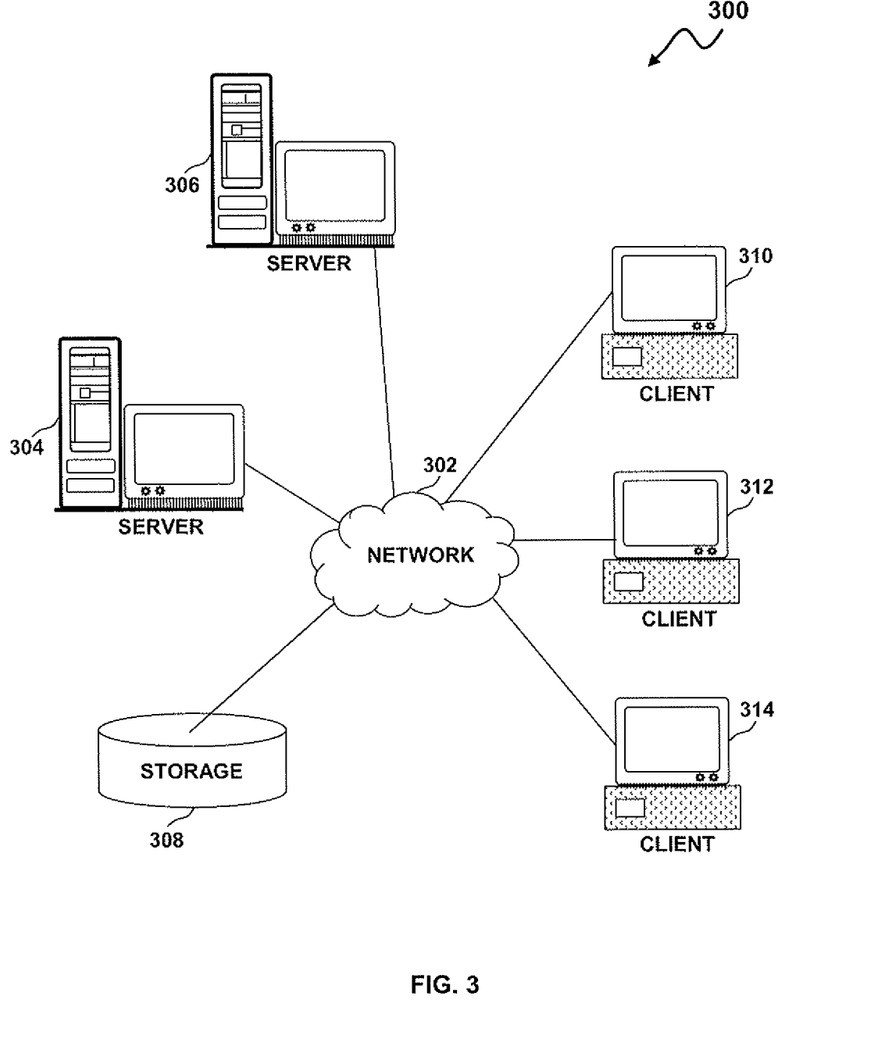
FIG. 3 depicts a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

Illustrated in FIG. 2, a computer software system 150 is provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to the various components and modules described herein, such as, for example, the method 600 depicted in FIG. 6.

FIG. 3 depicts a graphical representation of a network of data-processing systems in which aspects of the present invention may be implemented. Network data-processing system 300 is a network of computers in which embodiments of the present invention may be implemented. Network data-processing system 300 contains network 302, which is the medium used to provide communications links between various devices and computers connected together within network data-processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data-processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data-processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
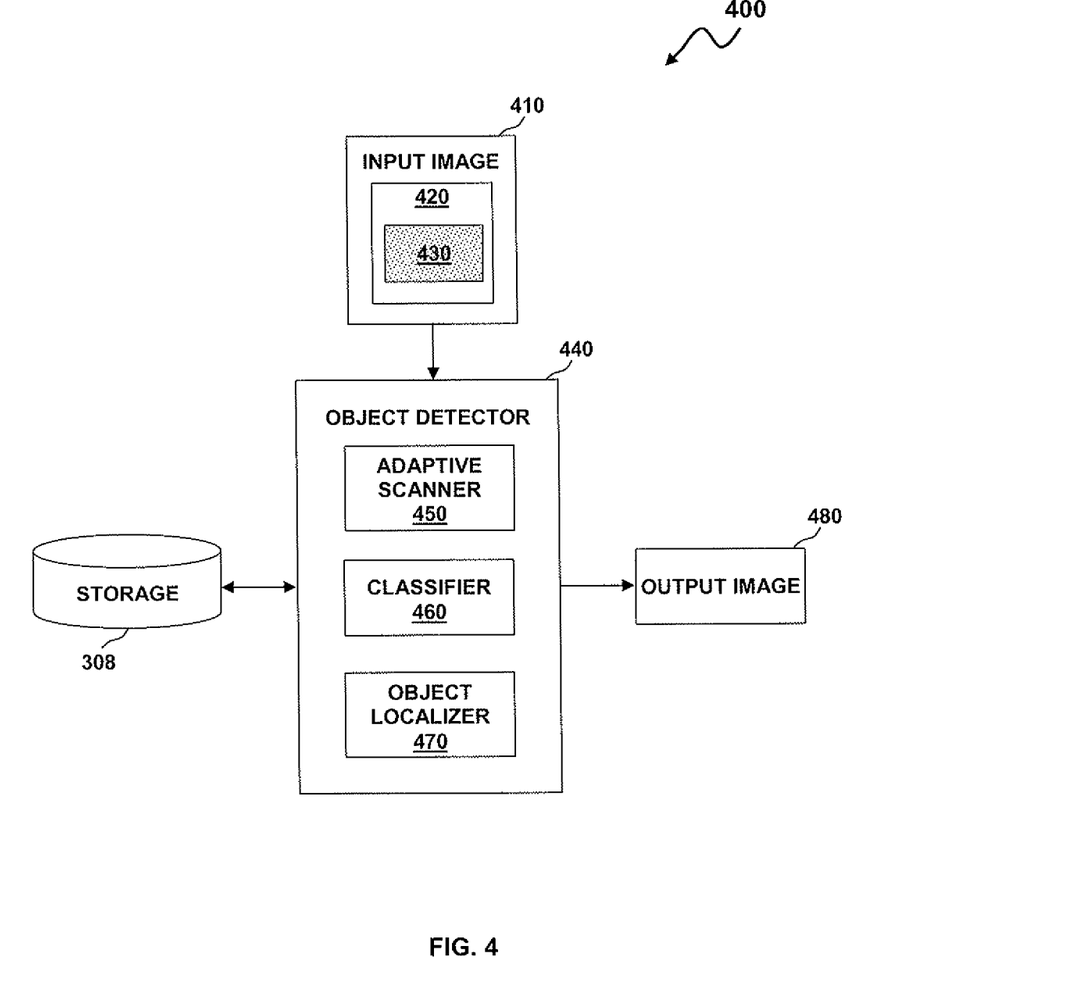
FIG. 4 illustrates a block diagram of an object detection system, which can be implemented in accordance with the present invention.

FIG. 4 illustrates a block diagram of an object detection system 400, which can be implemented in accordance with the present invention. System 400 may be implemented in the context of a computing system such as computer software system 150, data-processing apparatus 100 and/or system 300, depending upon design considerations. The object detection system 400 generally includes an input image 410, which can be a digital image comprises of bits i.e., pixels based on a photographic image, an image from a video, a computer created image, or other digital image. The input image 410 includes an object representation i.e., instance of an object 430 displayed in a window 420 of the image 410. The object detection system 400 further includes an object detector 440 and the data storage 308 as shown in FIG. 3, which can be utilized to detect one or more instances of certain objects i.e., a predefined category of objects.

The object representation can be a recognizable instance of the object 430 based on a realistic e.g., photographic, drawn, painted, caricatured, cartoon, or other recognizable representation of the object. The contents of the window 420 can be a part of the input image 410. The object 430 can be a certain object based on a predefined type or category of objects, such as faces, dogs, cars, trees, or other recognizable objects with a distinct appearance that distinguishes them from other objects. The object detector 440 can be a software program, routine, or an application module 152 as shown in FIG. 2, which detects instances of objects in the image 410.

The object detector 440 includes a classifier 460 for e.g., a classification function based on one or more features of an object that evaluates the image 410 or part of an image 410 to determine if the object 430 can be detected or not. The object detector 440 further includes an adaptive image scanner 450 that processes the input image 410 to divide the image 410 into smaller windows such as window 420. The data storage 308 can be a data storage device such as one or more disk drives associated with the object detection system 400 that stores data such as the input image 410, working copies of the input image 410 as it is processed, and an output image 480. The output image 480 can be a digital image composed of bits based on the input image 410 with highlighting that indicates the detected objects. Alternatively the output can constitute a list containing coordinates of detected objects along with their size, confidence of detection and possibly other information, depending upon design considerations and goals.

Figure 5:
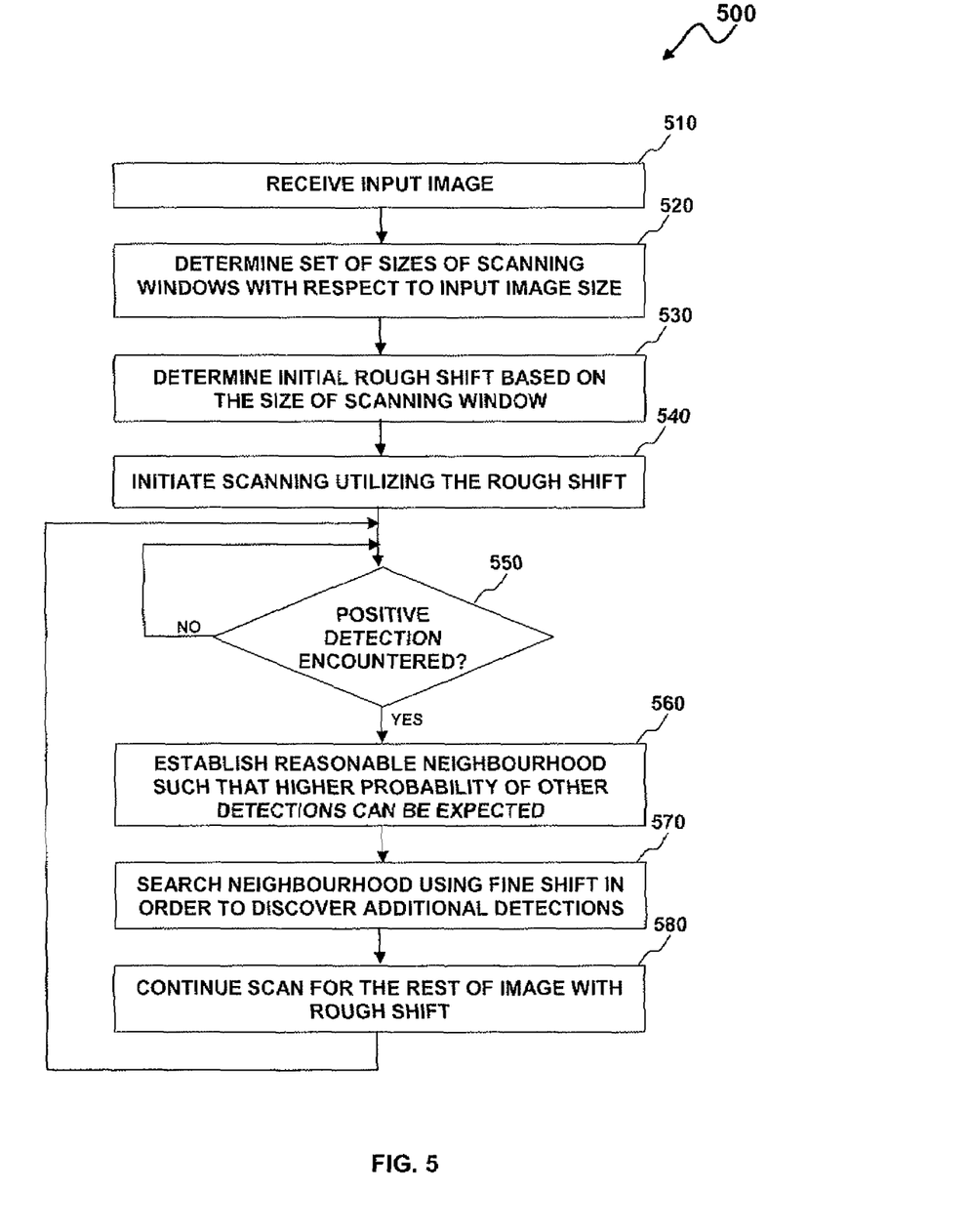
FIG. 5 illustrates a detailed flow chart of operations illustrating logical operational steps of a method for detecting objects in an image utilizing adaptive scanning strategy for scan acceleration, which can be implemented in accordance with a preferred embodiment.

Referring to FIG. 5, a detailed flow chart of operations illustrating logical operational steps of a method 500 for detecting objects in an image utilizing adaptive scanning strategy for scan acceleration is illustrated, which can be implemented in accordance with a preferred embodiment. Note that the computer-implemented method 500 depicted in FIG. 5 can be implemented in the context of a software module such as, for example, the application module 152 of computer software system 150 depicted in FIG. 2. An input image 410 can be received from a photograph or a video camera, from the data storage 308, or from another suitable source of digital images, as shown at block 510. A set of sizes of a scanning window 420 can be determined with respect to the input image size, as illustrated at block 520. An initial rough shift based on the size of the scanning window 420 can be determined, as depicted at block 530. Thereafter, as indicated at block 540, scanning can be initiated utilizing the rough shift.

The adaptive image scanner 450 scans the input image 410 to divide the image 410 into scanning windows 420 and utilizes a classifier 460 to classify each sub window 420. The scanning window 420 can be classified with respect to a cascade of homogenous classification functions covering one or more features of the object 430. Next, as depicted at block 550, a determination can be made whether a positive detection of the object 430 can be encountered. If a positive detection is not encountered, scanning can be continued with a rough step, as depicted at block 540. Otherwise, a reasonable neighborhood can be established such that a higher probability of other detections can be expected, as depicted at block 560. The neighborhood can be searched utilizing fine shift in order to discover additional detections, as depicted at block 570. The object detector 440 outputs an output image 480 with the encountered detections. After the local neighborhood is sought through the scan can be continued with the rough step corresponding to the actual scale, as shown at block 580. These encountered detections can be collected and can be utilized for further processing.

Figure 6:
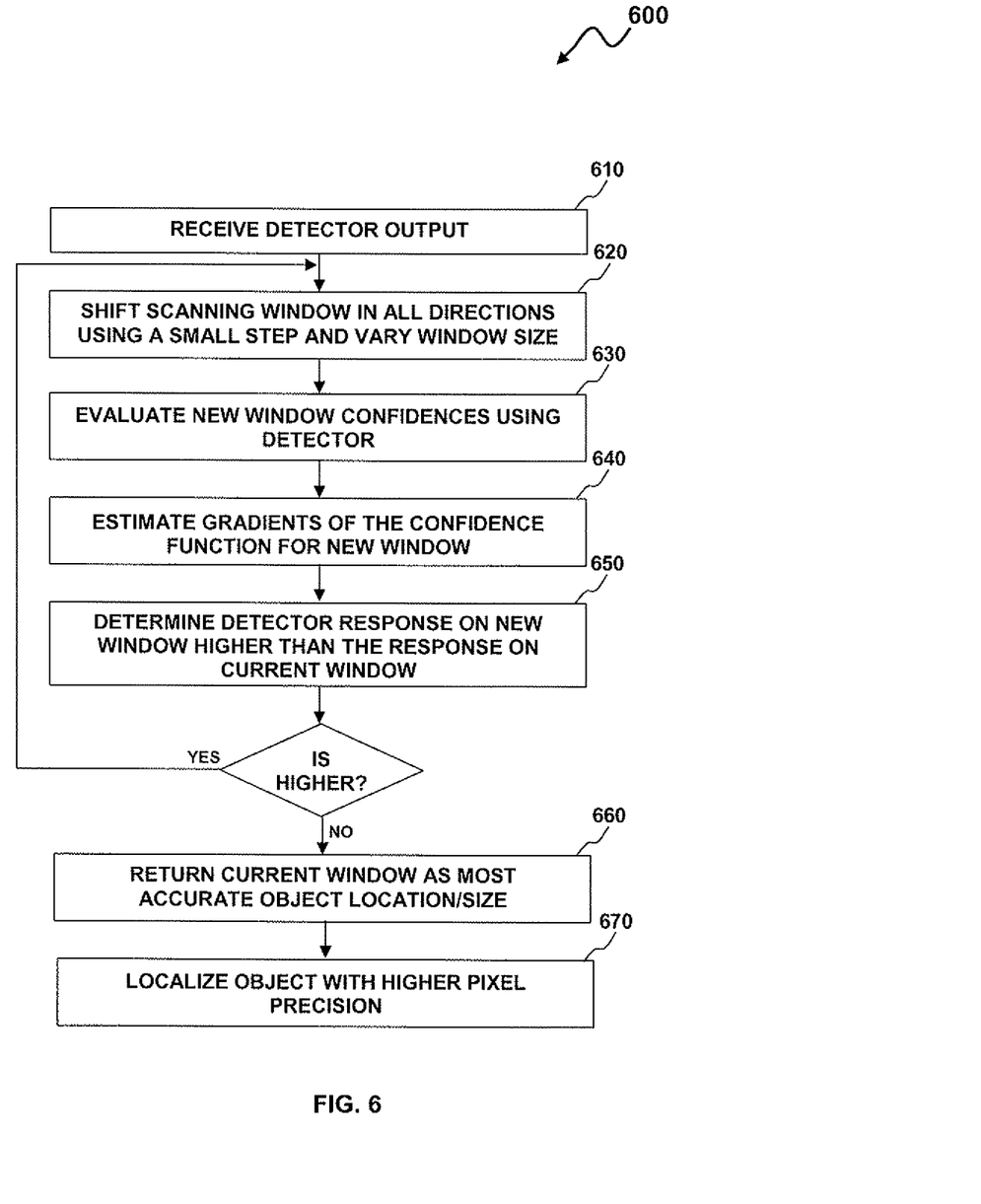
FIG. 6 illustrates a detailed flow chart of operations illustrating logical operational steps of a method for object localization, which can be implemented in accordance with a preferred embodiment.

Referring to FIG. 6, a detailed flow chart of operations illustrating logical operational steps of a computer-implemented method 600 for enhanced object localization is illustrated, which can be implemented in accordance with a preferred embodiment. Note that in FIGS. 4-7, identical or similar parts or elements are generally indicated by identical reference numerals. As indicated at block 610, the output of the object detector 440 or a confidence function can be received. Next, as depicted at block 620, the scanning window 420 can be shifted in all directions using a small step and the window size can be varied. The window confidences for a new window can be evaluated utilizing the object detector 430, as shown at block 630.

The gradients of the confidence function (i.e., the output of the detector 430 for the new window) can be estimated utilizing a cascade of homogenous classification functions, as described at block 640. The response of the object detector 430 on the new window that is higher than the response on the current window can be determined, as depicted at block 650. If the detector response on the new window is higher than the response on the current window control moves to step 620 and the process can be continued for the new window. Otherwise, the current window can be returned as most accurate object location and/or size, as depicted at block 660. Thereafter, the object in the current window can be localized with higher pixel precision, as shown at block 670. Note that this methodology generally describes how the local maximum of confidence can be sought and this approach can be utilized for enhanced object localization. It is possible, however, that another embodiment can be implemented which collects all detection information in a given neighborhood.

Figure 7:
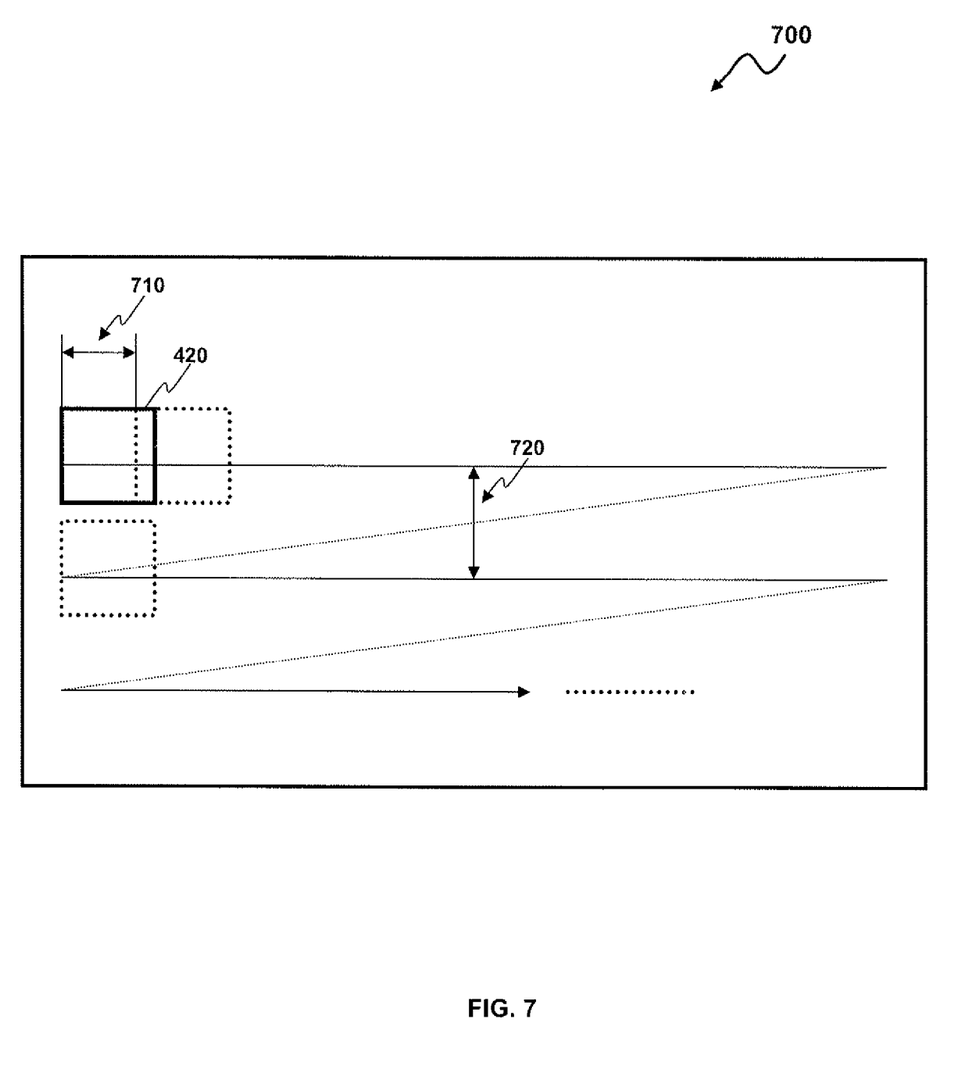
FIG. 7 depicts an image scanning illustration diagram of an object detection system showing shifts in a scan window, in accordance with the present invention.

FIG. 7 depicts an image scanning illustration diagram 700 of an object detection system showing shifts in a scan window, in accordance with the present invention. The illustration diagram 700 shows shifts of the scanning window 420 in x and y direction as indicated by arrows 710 and 720. The x shift 710 and y shift 720 are large for the purpose of demonstration; however they are usually much smaller in real application. The size of the scan window in FIG. 7 is shown for exemplary purpose only; however the same process can be usually repeated for scanning window of various sizes. The scanning window 420 can be shifted in x direction and y direction and the window size can be varied image continuously for local maximum confidence detection.

Figure 8:
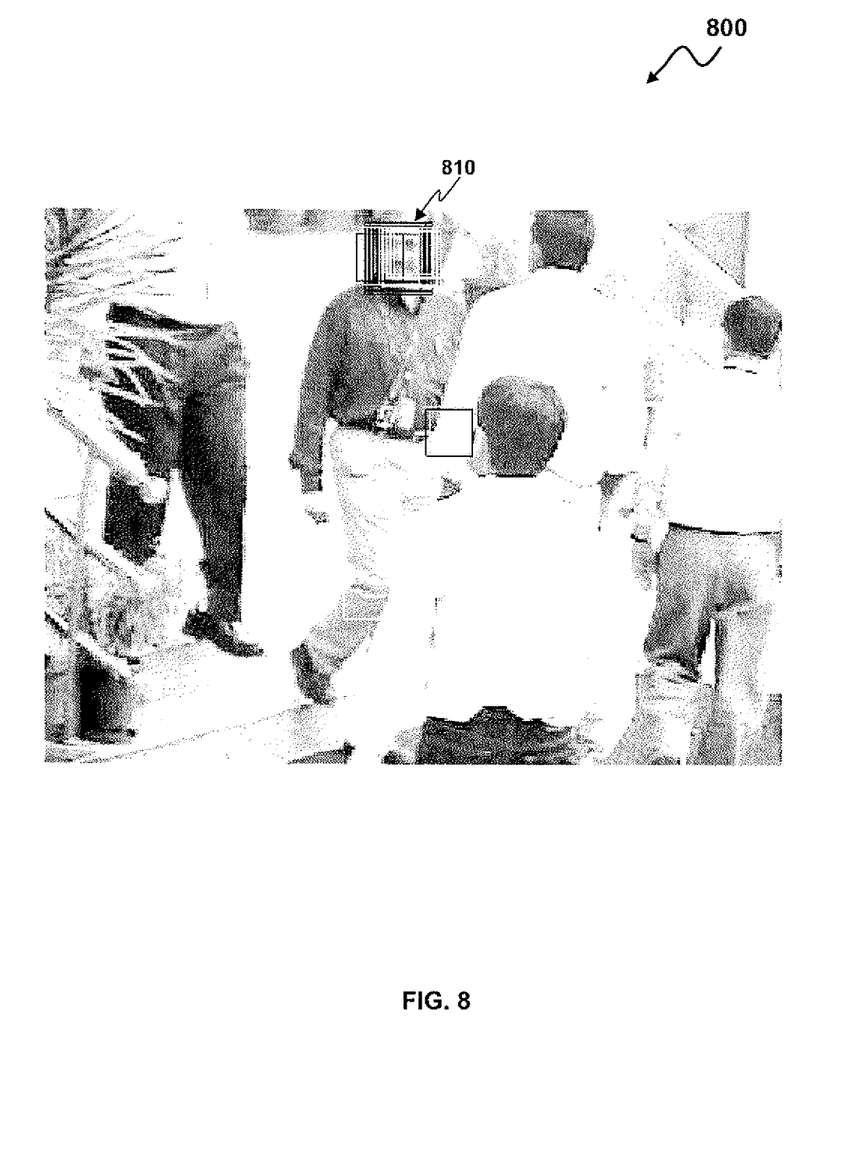
FIG. 8 depicts an exemplary pictorial image showing raw output of an object detector with multiple detections, in accordance with the present invention.

FIG. 8 depicts an exemplary pictorial image 800 showing raw output of object detectors with multiple detections, in accordance with the present invention. The pictorial image 800 includes output of the object detectors with multiple detections of similar size such as 810 at similar locations. The multiple detections 810 can be processed in order to output a single detection by utilizing methods 500 and 600 shown in FIG. 5 and FIG. 6.

Figure 9:
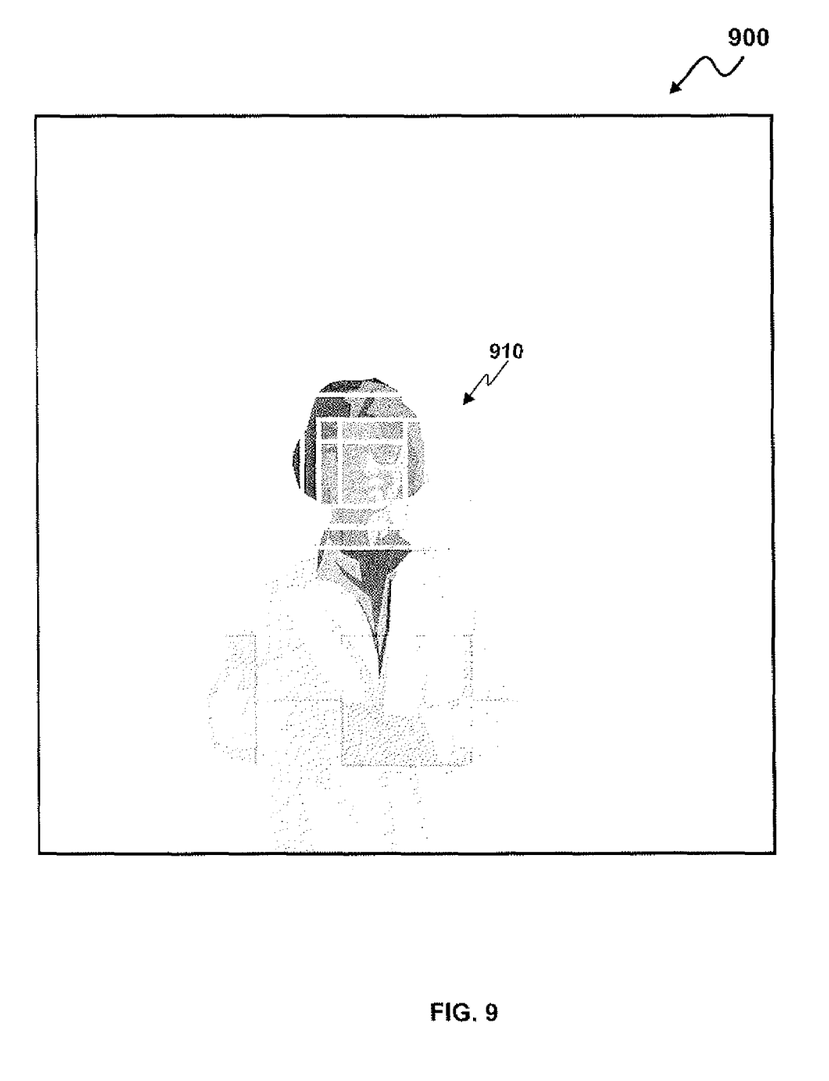
FIG. 9 depicts an exemplary image showing dense search for scan acceleration, in accordance with the present invention.
Figure 10:
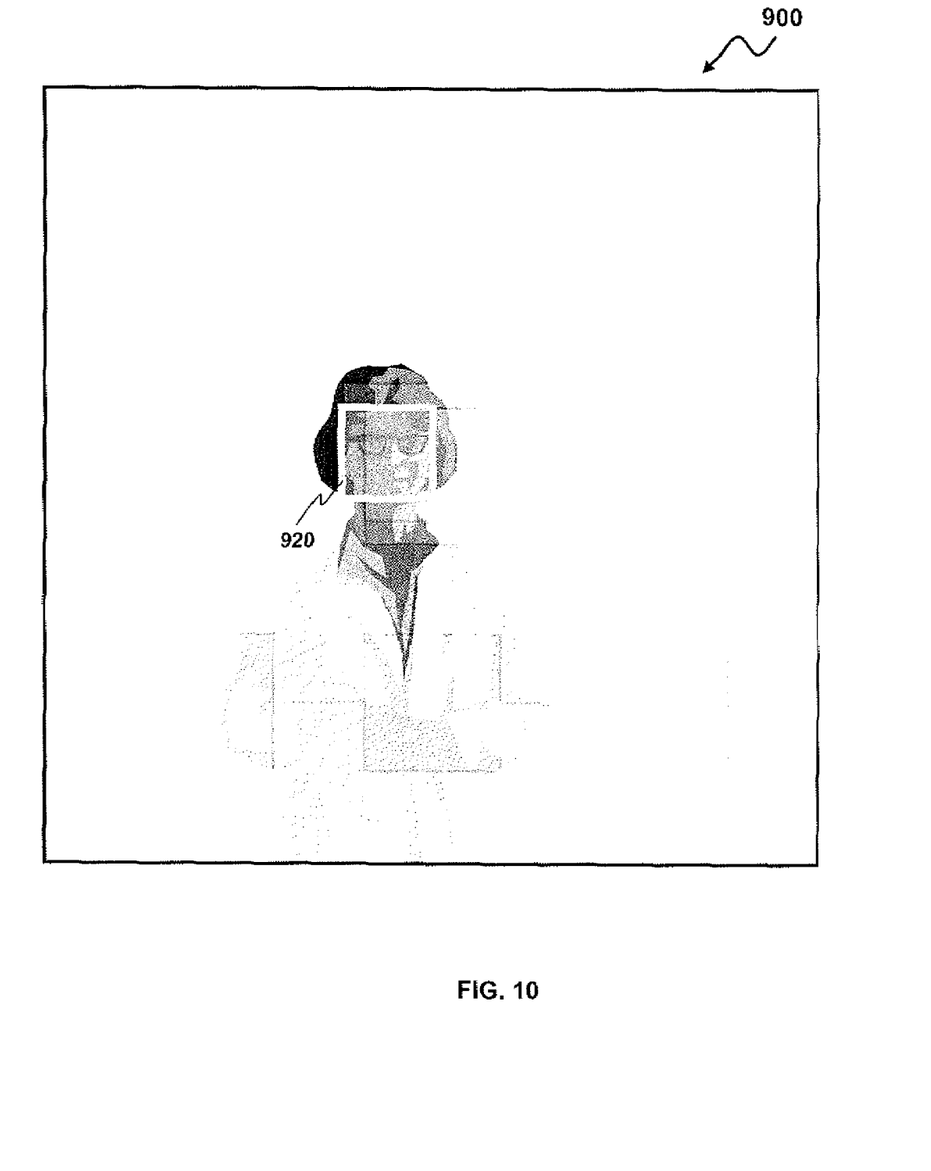
FIG. 10 depicts the exemplary image showing fine object localization, in accordance with the present invention.

FIG. 9 depicts exemplary image 900 showing dense search for local maximum confidence detection, in accordance with the present invention. The image 900 generally includes scan windows such as window 910 showing local dense search for better scan acceleration which indicates a higher probability of object occurrence within the image 900. FIG. 10 depicts the exemplary image 900 with fine object localization, in accordance with the present invention. The window 920 depicts result of fine object localization. The higher probability of potential detections can be given directly by positive response of the object detector 440 for fine local search. This can be initiated by any function, which indicates a higher probability of detections in given area of image. For example it can be a motion mask when a sequence is processed or an output from a skin color detection algorithm.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 and 600 described herein can be deployed as process software in the context of a computer system or data-processing system or computer-usable medium such as that depicted in FIGS. 1-3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method for detecting objects in an image, comprising:
   determining an initial rough shift of an input image based on a size of a scanning window in order to scan said input image for a plurality of potential detections, wherein said scanning window is classifiable with respect to a cascade of homogenous classification functions based on one or more features of an object to be detected;
   estimating at least one gradient of a confidence function for said scanning window based on said cascade of homogenous classification functions to determine a probability of an object occurrence in a particular area of said scanning, wherein said confidence function comprises an output of said object detector;
   outputting said object detector result indicating the presence of said object in said scanning window;
   adaptively changing a size and a scanning direction of said scanning window based on said object detector result and scanning an area of said input image utilizing a small shift, said small shift being less than said initial rough shift;
   detecting said object associated with said scanning window based on said response from said object detector in order to thereafter localize said object having sufficient features with a higher precision and accuracy thereto.

2. The computer implemented method of claim 1 further comprising:
   highlighting said detected object in an output image.

3. The computer implemented method of claim 1 wherein said cascade of homogenous classification functions and said input image are stored in a database.

4. The computer implemented method of claim 1 further comprising: outputting a detection value of the estimated gradient of said confidence function, coordinates and size of said detected object.

5. The computer implemented method of dam 1 wherein said one or more features comprises a head of a person exhibiting a facial region.

6. The computer implemented method of claim 1 wherein an output of said object detector comprises a measure of correct object alignment.

7. A system for detecting objects in an image, comprising: a processor; a data bus coupled to said processor; and a computer-usable medium embodying computer code, said computer-usable medium being coupled to said data bus, said computer program code comprising instructions executable by said processor and configured for:
   determining an initial rough shift of an input image based on a size of a scanning window in order to scan said input image for a plurality of potential detections wherein said scanning window is classifiable with respect to a cascade of homogenous classification functions based on one or more features of an object to be detected;
   estimating at least one gradient of a confidence function for said scanning window based on said cascade of homogenous classification functions to determine a probability of an object occurrence in a particular area of said scanning, wherein said confidence function comprises an output of said object detector;
   outputting said object detector result indicating the presence of said object in said scanning window;
   adaptively changing a size and a scanning direction of said scanning window based on said object detector result and scanning an area of said input image utilizing a small shift, said small shift being less than said initial rough shift; and
   detecting said object associated with said scanning window based on said response from said object detector in order to thereafter localize said object having sufficient features with a higher precision and accuracy thereto.

8. The system of claim 7 wherein said instructions are further configured for:
   highlighting said detected object in an output image.

9. The system of claim 7 further comprising: outputting a detection value of the estimated gradient of said confidence function, coordinates and size of said detected object.

10. The system of claim 7 wherein said object comprises a particular feature of said image.

11. The system of claim 7 wherein said instructions are further configured for:

determining a set of sizes associated with said scanning window with respect to said input image size, wherein said object comprises an object for which said object detector is trained to identify.

12. The system of claim 11 wherein said cascade of homogenous classification functions and said input image are stored in a database.

13. A non-transitory computer-usable medium embodying computer program code, said computer program code comprising computer executable instructions configured for:
   determining an initial rough shift of an input image based on a size of a scanning window in order to scan said input image for a plurality of potential detections shift wherein said scanning window is classifiable with respect to a cascade of homogenous classification functions based on one or more features of an object to be detected;
   estimating at least one gradient of a confidence function for said scanning window based on said cascade of homogenous classification functions to determine a probability of an object occurrence in a particular area of said scanning, wherein said confidence function comprises an output of said object detector;
   outputting said object detector result indicating the presence of said object in said scanning window;
   adaptively changing a size and a scanning direction of said scanning window based on said object detector result and scanning an area of said input image utilizing a small shift, said small shift being less than said initial rough shift; and
   detecting said object associated with said scanning window based on a response from an object detector in order to thereafter localize said object having sufficient features with a higher precision and accuracy thereto.

14. The non-transitory computer-usable medium of claim 13, wherein said embodied computer program code further comprises computer executable instructions configured for:
   determining a set of sizes associated with said scanning window with respect to said input image size.

15. The non-transitory computer-usable medium of claim 13 wherein said embodied computer program code further comprises computer executable instructions are further configured for: highlighting said detected object in an output image.

16. The non-transitory computer-usable medium of claim 13 wherein said embodied computer program code further comprises computer executable instructions are further configured for: outputting a detection value of the estimated gradient of said confidence function, coordinates and size of said detected object.

17. The non-transitory computer-usable medium of claim 13, wherein said embodied computer program code further comprises computer executable instructions configured for:
   determining a set of sizes associated with said scanning window with respect to said input image size, wherein said object comprises a head of a person exhibiting a facial region.

* * * * *